United States Patent
Hancock et al.

(12) 
(10) Patent No.: US 6,484,913 B1
(45) Date of Patent: Nov. 26, 2002

(54) BRACKET ASSEMBLY FOR ALL TERRAIN VEHICLE HANDLE BARS

(76) Inventors: Dennis H. Hancock, 5752 Silverstone Cir., Mountain Green, UT (US) 84050; Jeffrey D. Hancock, 6702 S. 1800 East, Uintah, UT (US) 94405

( * ) Notice: Subject to any disclaimer, the term of this patent is extended or adjusted under 35 U.S.C. 154(b) by 0 days.

(21) Appl. No.: 09/910,614

(22) Filed: Jul. 23, 2001

(51) Int. Cl.[7] .................................................. B60R 7/00
(52) U.S. Cl. ...................... 224/401; 224/420; 224/445; 224/446; 224/448; 224/913; 42/96; 211/64
(58) Field of Search ................................ 224/401, 410, 224/413, 420, 445, 446, 448, 913, 916; 42/94, 96; 211/64

(56) References Cited

U.S. PATENT DOCUMENTS

| | | | | |
|---|---|---|---|---|
| 492,740 A | * | 2/1893 | Copeland | 224/448 |
| 4,607,772 A | * | 8/1986 | Hancock | 224/413 |
| 4,823,673 A | * | 4/1989 | Downing | 224/401 |
| D386,304 S | * | 11/1997 | Hancock | D12/406 |
| 5,697,181 A | * | 12/1997 | Savant | 211/64 |
| 5,915,572 A | * | 6/1999 | Hancock | 211/64 |
| 6,145,718 A | * | 11/2000 | Edwards | 224/401 |
| 6,199,734 B1 | * | 3/2001 | Meeks | 224/401 |

* cited by examiner

*Primary Examiner*—Stephen K. Cronin

(57) ABSTRACT

An article support bracket that will securely mount to an upwardly extending portion of a handlebar of an all terrain vehicle and that will extend upwardly from the mounting connection between and around vehicle components also attached to the vehicle handlebars, to provide a support extending above outwardly and rearwardly extending portions of the handlebar that will acommodate an article holder for an elongate article such as a long gun, tool or another piece of equipment in position extending across the vehicle handlebars.

2 Claims, 3 Drawing Sheets

BRACKET ASSEMBLY FOR ALL TERRAIN VEHICLE HANDLE BARS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to support brackets to be mounted on all terrain vehicles so that the vehicle can carry objects such as long guns supported above and by the handle bars of the vehicle.

2. Description of the Related Art

Operators of all terrain vehicles (ATV)s often desire to have long guns conveniently available for use. Various systems for supporting such guns in position extending across the outwardly extending portions of handle bars of ATVs have been proposed. Generally the systems proposed in the past have required use of mounting brackets secured to outward extensions of the handle bars and supporting upwardly extending gun holders that will hold a gun placed therein transversely across the handle bars.

It has now become common for manufacturers of ATVs to mount vehicle components such as brake levers, vehicle turn signals, brake fluid reservoirs, radio controls, signal horns, navigation and locator housings, and others, on the outward extensions of the handle bars. Consequently, there is little room on such extensions to mount supports for other accessories and particularly for mounting brackets that will properly support long guns, such as rifles and shotguns,

3. Brief Summary of the Invention

It is an object of the present invention to provide a bracket assembly that will securely mount on an upwardly extending portion of an ATV handle bar. The bracket assembly must extend upwardly from the upwardly extending portion of the handlebars, angularly and upwardly away from the handlebars and outwardly to receive an adjustably positioned article holder. The bracket must also provide for repositioning of the components thereof to allow for clearance past supported structures on the handlebars and adjustment necessary to supporting of guns and the like on a pair of article holders.

4. Features of the Invention

Principal features of the invention include a bar clamp having an interiorly threaded elongate bore, a splined cap having a central hole therethrough, a cantilevered plate having a splined sleeve at one end that will mate with the splined cap and a cantilevered end with a plurality of spaced apart holes therethrough. An angled plate has one arm bolted to the cantilevered plate and an article holder receptacle bolted to another arm of the angled plate. The bar clamp will attach to upwardly extending portions of handlebars and the adjustment features of the splined cap, cantilevered plate, angled plate and the article holder receptacle allow for clearance past supported structures found on virtually any ATV so that the bracket of the invention will support rifles and the like above the handlebars of the ATV, Other objects and features of the invention will become apparent to those skilled in the art to which the invention pertains from the following detailed description and drawings, disclosing what is presently contemplated as being the best mode of the invention.

DETAILED DESCRIPTION

Figure 1:
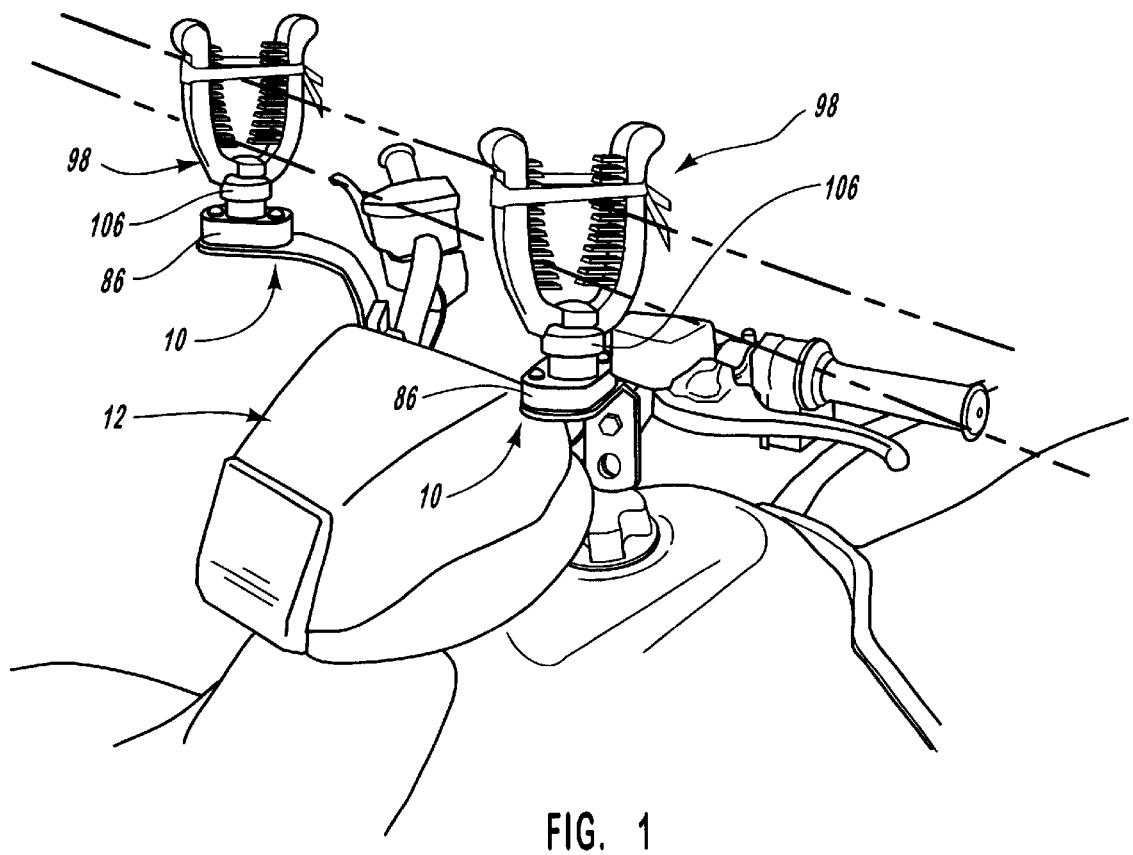
FIG. 1 is a perspective view of a pair of brackets of the invention mounted to upstanding portions of the handlebars of an ATV, shown fragmentarily and with article holders mounted on the brackets and with an article shown in phantom secured in the article holders above the handlebars.

Referring now to the drawings:

In the illustrated preferred embodiment the bracket assembly of the present invention, shown generally at 10, is intended for use on an all-terrain vehicle (ATV) 12. The bracket assembly includes a bar clamp 14 that provides means for mounting of the bracket assembly to an upwardly extending handlebar 16 of the ATV.

Bar clamp 14 has a body 18 with a non-circular cross-section with a V-notch 20 in one side thereof, a pair of holes 22 and 24 at opposite ends of the V-notch and a threaded bore 26 in one end thereof. A U-bolt 28 will straddle a handlebar 16 at a desired location and the ends 30 and 32 of the U-bolt are inserted through the holes 22 and 24 and nuts 34 and 36 are threaded onto the ends of the U-bolt to secure the bar clamp 14 to the handlebar.

A cap 38 has an interior cross section corresponding to the non-circular cross section of the body 18, a hole 40 centrally through a closed end 42 of the cap. Hole 40 is aligned with the bore 26 of the body 18 and the cap fits over the body. A ring of splines 44 surrounds the closed end of the cap 38.

A cantilevered plate 50 has a ring 52 on one end. The interior of the ring 52 has splines therein to cooperate with the splines 44 of cap 38. A hole 54 through plate 50 extends through the center of ring 52 and a plurality of holes 56,58 and 60 extend through another end of the cantilevered plate. The holes 56–60 are each equidistant from the hole 54. Another bolt 62 inserted through hole 54 and a selected hole 56, 58 or 60 is secured in place by nut 63.

An angled plate 64 has a first straight leg 66 with holes 68 and 70 therethrough. A bolt 72 extends through the hole 68 of plate 64, hole 54 of cantilevered plate 50 and hole 40 of cap 38 to be threaded into the bore 26 of body 18 to secure the bar clamp 14, cap 38 and cantilevered plate 50 to the cantilevered plate 50.

Angled plate 64 also has a second straight leg 70, with a pair of holes 72 and 74 therethrough. Second straight leg 70 is connected to first straight leg 64 by an angled length 76.

An article holder receiver 80 is attached to the second straight leg 70 by bolts 82 and 84. The article holder receiver includes a base 86 and a support post 88 having a ring of splines 90 therearound. Arcuately spaced holes 92 at one end of the base 86 and arcuately spaced holes 94 through the opposite end of base 86 have bolts 82 selectively inserted therethrough and through the holes 72 and 74 of the second straight legs to receive nuts 84 and to secure an article holder, such as is shown at 98 in desired angular relationships. The support post 88 extends upwardly from the base 86 and terminates with a ring 102 of equally spaced splines around a top edge 104. The support post will receive an article holder 98, with an interiorly splined base 106 telescoped over the exterior splines of the support post 88.

Figure 2:
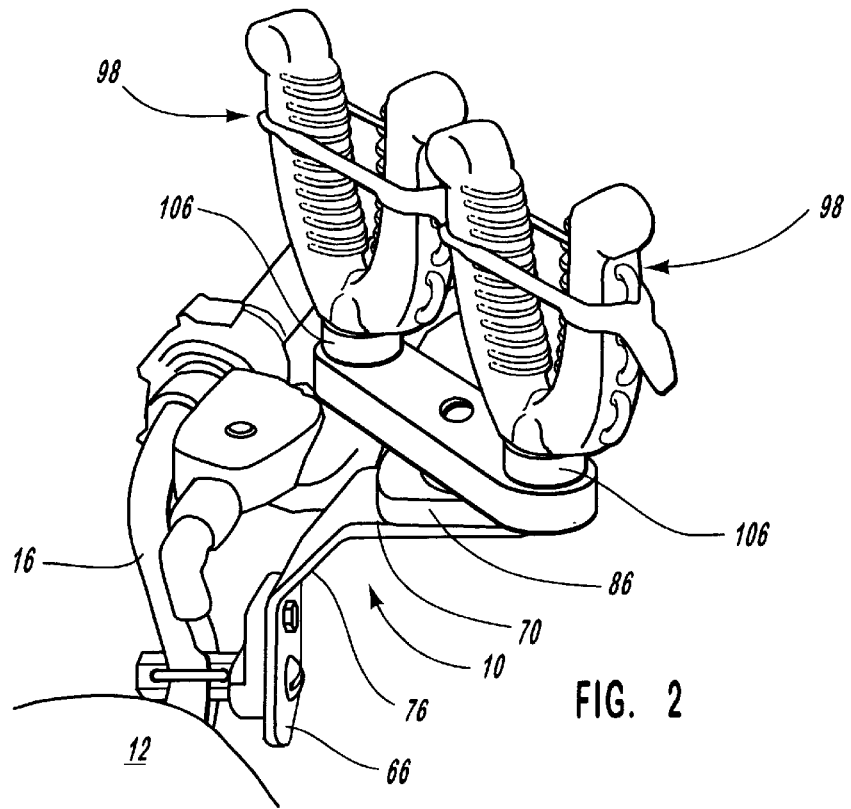
FIG. 2, an perspective view of a single bracket of the invention mounted on a single handlebar of an ATV, shown fragmentarily, and having a pair of article holders mounted on the bracket.
Figure 3:
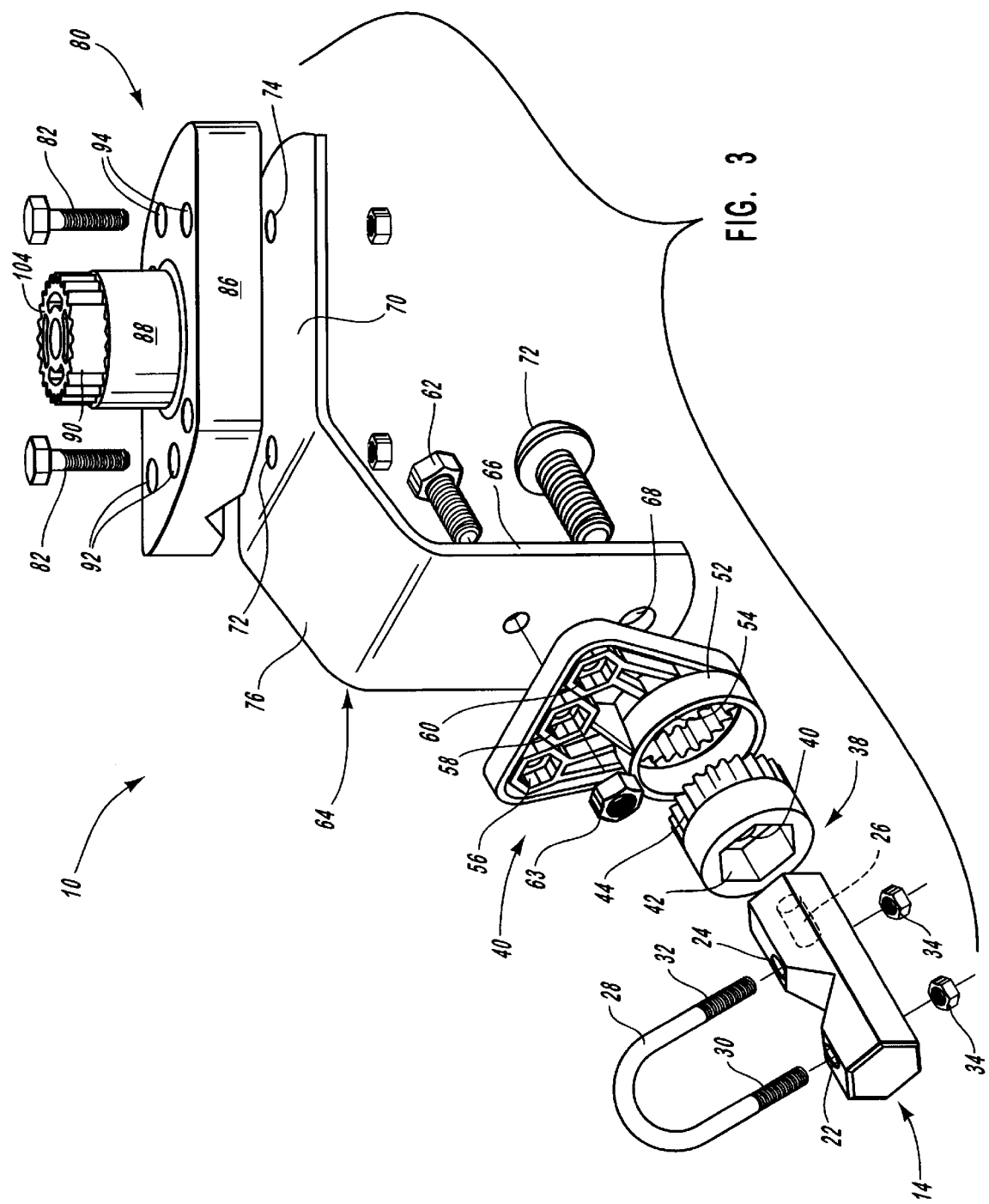
FIG. 3, an enlarged, exploded, perspective view of a bracket of the invention.
Figure 4:
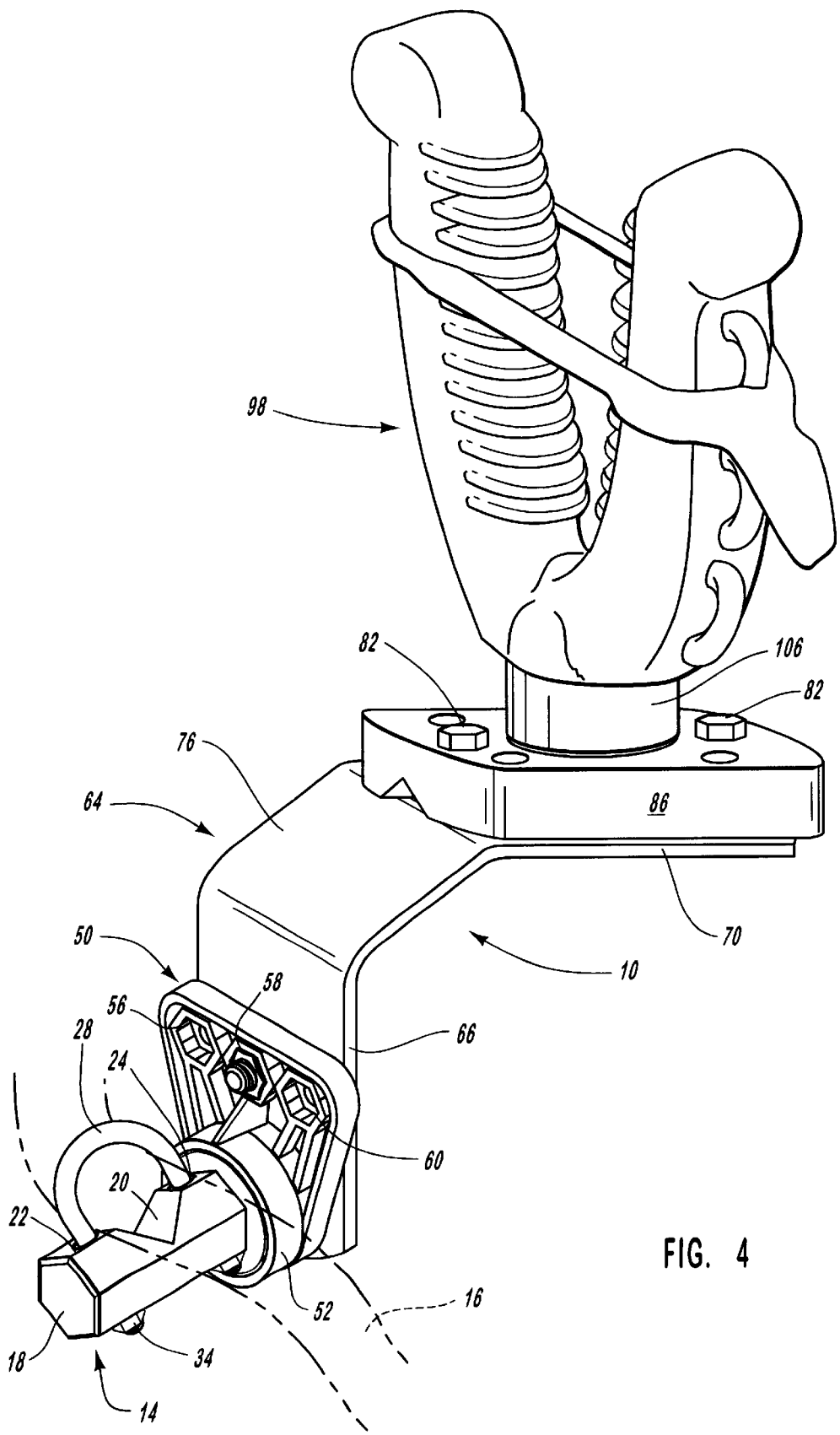
FIG. 4, an enlarged perspective view, with an ATV handlebar shown in phantom.

Bracket assembly 10 is adaptable for use with all, or at least most of the ATV's presently being marketed. The rotatational adjustability between the bar clamp 14 and cap 38 and cap 38 and cantilevered plate 50, together with the limited rotation of the angled plate 64 on the cantilevered plate 50 and the capability of rotating an article holder, permits proper positioning of the article holder. The article holder 98, having bifurcated arms with holding vanes and resilient clamps is a very suitable article holder. Such an article holder may include a pair of bifurcated arms and vanes, as shown in FIG. 2. Regardless of the article holder used, the bracket assembly of the invention will attach to a lower, upwardly extending portion of a handlebar and then be aligned to provide clearance from other structures mounted on the handlebars before extending upward to provide support for a long gun or other elongate article extending across and above the handlebars between a pair of supported article holders.

Although a preferred form of our invention has been herein disclosed, it is to be understood that the present disclosure is by way of example and that variations are possible without departing from the subject matter coming within the scope of the following claims, which subject matter we regard as our invention.

We claim:

1. An article support bracket assembly for use with handlebars of all-terrain vehicles comprising clamp means for attachment to an upwardly extending portion of an all-terrain vehicle handlebar;

an angled plate having a first straight leg secured to said clamp means in a rotationally selected position and a second straight leg extending normal to said first straight leg and connected to said first straight leg by an angled length; and an article receiver holder fixed to and projecting from said second straight leg in a direction opposite to the projection of said first straight leg from said angled length, said article receiver holder comprising a base secured to said second straight leg and a support post projecting from said base and having a ring of splines extending around the end of said support post remote from said base.

2. An article support bracket assembly as in claim 1, wherein the clamp means for attachment to an upwardly extending portion of an all terrain handlebar comprises a non-circular body having a threaded bore in one end thereof, a V-notch in a side wall of said body, a pair of spaced apart holes through said body at opposite ends of said V-notch, a U-bolt having threaded ends inserted through said spaced apart holes and nuts threaded onto said ends of said U-bolt, a cap having a non-circular interior conforming to the non-circular shape of said body, a circular exterior with a ring of splines around a closed end of said cap remote from said body, a cantilevered plate having an interiorly splined ring projecting from one end thereof, said splines of said ring cooperating with said splines around the closed end of said cap to non-rotatably secure said cantilevered plate to said cap, a hole through said cantilevered plate centrally of said splined ring a plurality of holes through said cantilevered plate, with each said hole of said plurality of holes being equidistant from said hole centrally through said splined ring, a pair of spaced apart holes through said first straight leg, a first bolt through one of said holes through said first straight leg and said hole through said cantilevered plate centrally through said splined ring and threaded into the bore of the body of said clamp means to secure said angled plate, said cantilevered plate and said cap to said body of said clamp means, and a second bolt inserted through a second hole through said first straight leg and a selected one of said plurality of holes through said cantilevered plate and a nut threaded onto an end of said second bolt to secure said cantilevered plate to said cap in a selected angular relationship.

\* \* \* \* \*